US012675387B2

(12) United States Patent　　　　(10) Patent No.:　US 12,675,387 B2
Pearson et al.　　　　　　　　　　　(45) Date of Patent:　　　　Jul. 7, 2026

(54) LIVE TRACE EXPLORER

(71) Applicant: Jama Software, Inc., Portland, OR (US)

(72) Inventors: Kevin Pearson, Portland, OR (US); Kevin Steigerwald, Portland, OR (US); Geoffrey Clemm, Portland, OR (US)

(73) Assignee: JAMA SOFTWARE, INC., Portland, OR (US)

( * ) Notice: Subject to any disclaimer, the term of this patent is extended or adjusted under 35 U.S.C. 154(b) by 305 days.

(21) Appl. No.: 18/235,297

(22) Filed: Aug. 17, 2023

(65) Prior Publication Data

US 2024/0061763 A1　　　Feb. 22, 2024

Related U.S. Application Data

(60) Provisional application No. 63/399,412, filed on Aug. 19, 2022.

(51) Int. Cl.
　G06F 9/44　　　(2018.01)
　G06F 11/362　　(2025.01)
　G06F 11/3668　　(2025.01)
　G06F 11/3698　　(2025.01)
(52) U.S. Cl.
　CPC ...... G06F 11/3636 (2013.01); G06F 11/3672 (2013.01); G06F 11/3698 (2025.01)
(58) Field of Classification Search
　None
　See application file for complete search history.

(56) References Cited

U.S. PATENT DOCUMENTS

| | | |
|---|---|---|
| 7,490,319 B2 | 2/2009 | Blackwell et al. |
| 7,877,737 B2 | 1/2011 | Austin et al. |
| 8,191,044 B1 * | 5/2012 | Berlik ................. G06F 11/3672 |
| | | 717/124 |

(Continued)

FOREIGN PATENT DOCUMENTS

| | | |
|---|---|---|
| CN | 106814730 B | 1/2019 |
| CN | 115688446 A | 2/2023 |
| CN | 116402276 A | 7/2023 |

OTHER PUBLICATIONS

N. Aizenbud-Reshef et al., "Model Traceability", 2006 (Year: 2006).*

(Continued)

*Primary Examiner* — Lanny N Ung
(74) *Attorney, Agent, or Firm* — Schwabe Williamson & Wyatt

(57)　　　　　　　ABSTRACT
An interactive GUI is disclosed for viewing and navigating among sets of hierarchical data items displayed on a client device of a user. The GUI displays containers representing and containing respective groups of the hierarchical data items. The containers are displayed in at least two sets, such as rows or columns, where a first set comprises requirement containers representing requirement items, and a second set comprises test containers representing test case items. Annotated edges are displayed between pairs of the containers, where each of the annotated edges indicating a type of relationship between the hierarchical data items in a respective pair of the containers and a percentage of the hierarchical data items in the pair of the containers that have suspect relationships.

20 Claims, 12 Drawing Sheets

200

(56) References Cited

U.S. PATENT DOCUMENTS

| | | | |
|---|---|---|---|
| 10,997,244 B2 | 5/2021 | Russell et al. | |
| 11,106,569 B1 | 8/2021 | Chapagain et al. | |
| 2005/0166094 A1* | 7/2005 | Blackwell ............ | G06F 11/368 |
| | | | 714/38.14 |
| 2008/0059977 A1* | 3/2008 | Brown ..................... | G06F 8/71 |
| | | | 719/316 |
| 2012/0173437 A1 | 7/2012 | Barker et al. | |
| 2015/0095890 A1* | 4/2015 | Stclair ..................... | G06F 8/10 |
| | | | 717/124 |

OTHER PUBLICATIONS

Jane Cleland-Huang et al., "Achieving Lightweight Trustworthy Traceability", 2014 (Year: 2014).*

Inflectra; "Requirements Traceability", Mar. 9, 2022, https://www.inflectra.com/Ideas/Topic/Requirements-Traceability.aspx#:~:text=Requirements%20Traceability%20Matrix,-The%20most%20common&text=The%20traceability%20matrix%20is%20used,modules%20and%20other%20project%20deliverables.

IBM; "Engineering Lifecycle Management Suite 6.0.4—Using Views", Mar. 9, 2022, https://www.ibm.com/docs/en/engineering-lifecycle-management-suite/lifecycle-management/6.0.4?topic=disciplines-using-views.

Dreef et al; "Global Overviews of Granular Test Coverage with Matrix Visualizations"; 2021 Working Conference on Software visualization (VisSoft); Sep. 27, 2021. https://ieeexplore.ieee.org/document/9604904.

* cited by examiner

Figure 2:
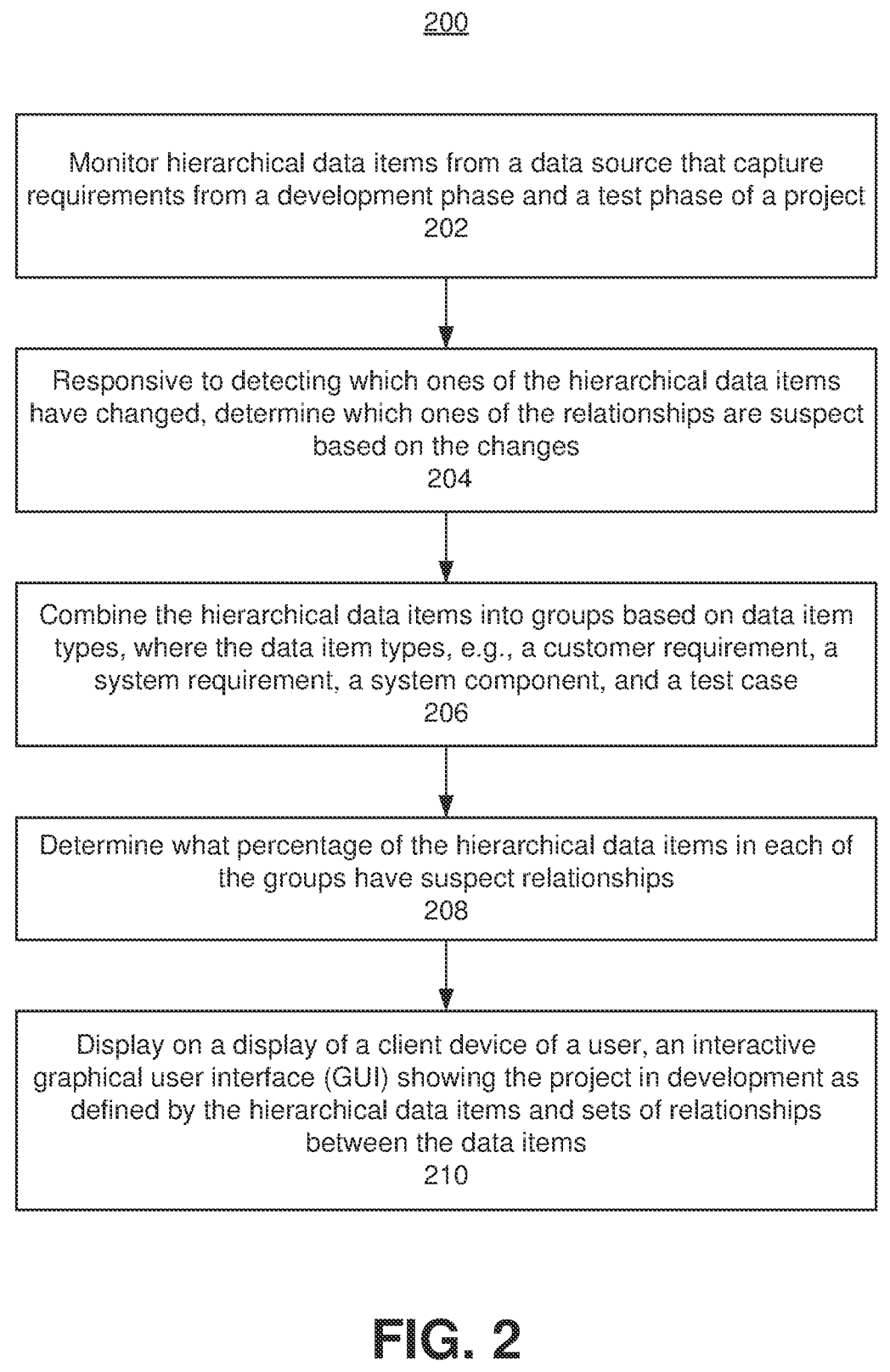

200

Monitor hierarchical data items from a data source that capture requirements from a development phase and a test phase of a project
202

Responsive to detecting which ones of the hierarchical data items have changed, determine which ones of the relationships are suspect based on the changes
204

Combine the hierarchical data items into groups based on data item types, where the data item types, e.g., a customer requirement, a system requirement, a system component, and a test case
206

Determine what percentage of the hierarchical data items in each of the groups have suspect relationships
208

Display on a display of a client device of a user, an interactive graphical user interface (GUI) showing the project in development as defined by the hierarchical data items and sets of relationships between the data items
210

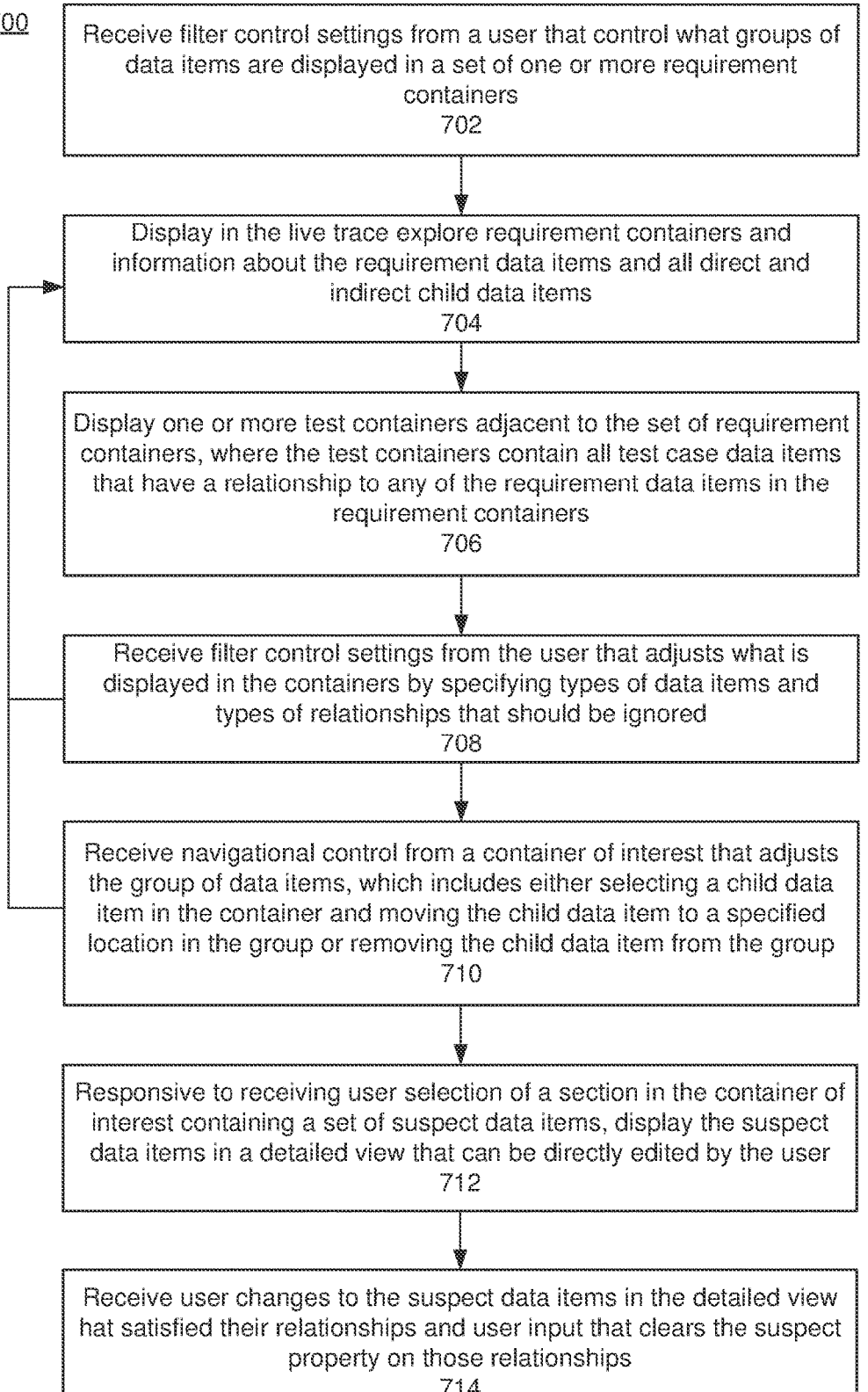

<u>700</u>

Receive filter control settings from a user that control what groups of
data items are displayed in a set of one or more requirement
containers
702

Display in the live trace explore requirement containers and
information about the requirement data items and all direct and
indirect child data items
704

Display one or more test containers adjacent to the set of requirement
containers, where the test containers contain all test case data items
that have a relationship to any of the requirement data items in the
requirement containers
706

Receive filter control settings from the user that adjusts what is
displayed in the containers by specifying types of data items and
types of relationships that should be ignored
708

Receive navigational control from a container of interest that adjusts
the group of data items, which includes either selecting a child data
item in the container and moving the child data item to a specified
location in the group or removing the child data item from the group
710

Responsive to receiving user selection of a section in the container of
interest containing a set of suspect data items, display the suspect
data items in a detailed view that can be directly edited by the user
712

Receive user changes to the suspect data items in the detailed view
hat satisfied their relationships and user input that clears the suspect
property on those relationships
714

FIG. 7

LIVE TRACE EXPLORER

CROSS-REFERENCE TO RELATED APPLICATIONS

This application claims the benefit of provisional Patent Application Ser. No. 63/399,412, filed Aug. 19, 2022, assigned to the assignee of the present application, and incorporated herein by reference.

BACKGROUND

A software or systems development process may have phases that may start with customer requirements. Once the user requirements are defined, the development process may move to a system design phase that may include high-level system design and architectural decisions. The output of this phase is a detailed system design specification. Thereafter, the development process may move to define systems components.

Each of these design phases may have corresponding test phases. For example, component testing may define testing procedures for individual test cases or components of the system are tested independently to ensure they function correctly as per the design. Integration testing may define tests for testing combinations of the individual units/components together to ensure their interactions and interfaces work as expected, and for testing the entire system as a whole to verify that it meets the specified requirements.

Requirements management is the process of gathering, analyzing, documenting, and managing the requirements for a project. Requirements traceability is the process of tracking and managing relationships between the data items or artifacts throughout the development cycle in both forwards and backwards direction. This includes tracking the requirements from their origin, through their development and specification, to their subsequent deployment and use and through periods of on-going refinement and iteration in any of these phases. Forward traceability is the ability to track a requirement to its downstream data items or artifacts, such as design documents, test cases, and code. And backward traceability is the ability to track a requirement to its upstream items, such as business needs, customer requirements, and use cases. Linking all of these items together in both directions is known as end-to-end traceability. Traceability can help to ensure that the requirements are complete and accurate, and that they are implemented correctly.

The relationships between the data items may be managed and traced using a traceability matrix. The traceability matrix is a table that lists all of the data items in a project, along with the relationships between them. There may be different types of relationships between the data items. A dependency relationship indicates that one data item cannot be implemented without the other data item. For example, a use case implementation may depend on a technical specification. A derivation relationship indicates that one data item is derived from another data item. For example, a test case may be derived from the use case. An implementation relationship indicates that one data item is implemented by another data item. For example, a software module may implement the use case. A validation relationship and a verification relationship indicate that one data item is validated or verified by another data item. For example, a user acceptance test may validate a software module.

A requirement that has the expected relationship is said to be "covered" by the related requirements or test cases. Queries can be written to determine which items do not have a required relationship, e.g., which customer requirements do not have a relationship to a system requirement, which customer requirements do not have a relationship to a validation test case, and which system requirements do not have a relationship to a verification test case.

In some advanced tools, a relationship is automatically marked in the database as "suspect" if an item related by the relationship is modified, indicating the specified relationship may not hold. An engineer can then inspect the two items related by a suspect relationship, and if they determine that the items satisfy the relationship, they would "clear" the suspect flag on the relationship.

One drawback with such tools is that most of the information pulled from the database about the data items and the relationships therein is shown in reports. This can be problematic as the database may store hundreds of thousands of data items and the data is dynamic in nature, meaning that the data is constantly changing.

Accordingly, it would be desirable to provide an improved method and system to enable users to view and navigate among all the data items and more easily determine which relationships needs to be addressed because they are suspect.

BRIEF SUMMARY

The disclosed embodiments describe methods and systems for displaying an interactive graphical user interface (GUI) for viewing and navigating among sets of hierarchical data items displayed on a client device of a user. Aspects of disclosed embodiments, include displaying in the GUI containers representing and containing respective groups of the hierarchical data items. The containers are displayed in at least two sets (e.g., in two columns or rows), where a first set comprises requirement containers representing requirement items, and the second set comprises test containers representing test case items. Annotated edges are displayed between pairs of the containers, where each of the annotated edges indicate a type of relationship between the hierarchical data items in a respective pair of the containers, and a percentage of the hierarchical data items in the pair of the containers that have the suspect relationships.

According to the method and system disclosed herein, the GUI enables a user to more easily view and navigate among sets of hierarchical data items to identify what items in a project are causing the problems, so that a user can modify those items to fix the problems.

BRIEF DESCRIPTION OF SEVERAL VIEWS OF THE DRAWINGS

FIG. 2 is a flow diagram illustrating operations of the live trace explorer engine according to one implementation.

FIG. 7 is a flow diagram illustrating a process performed by the live trace explorer engine to enable a user to clear suspect data items or relationships.

DETAILED DESCRIPTION

Figure 1:
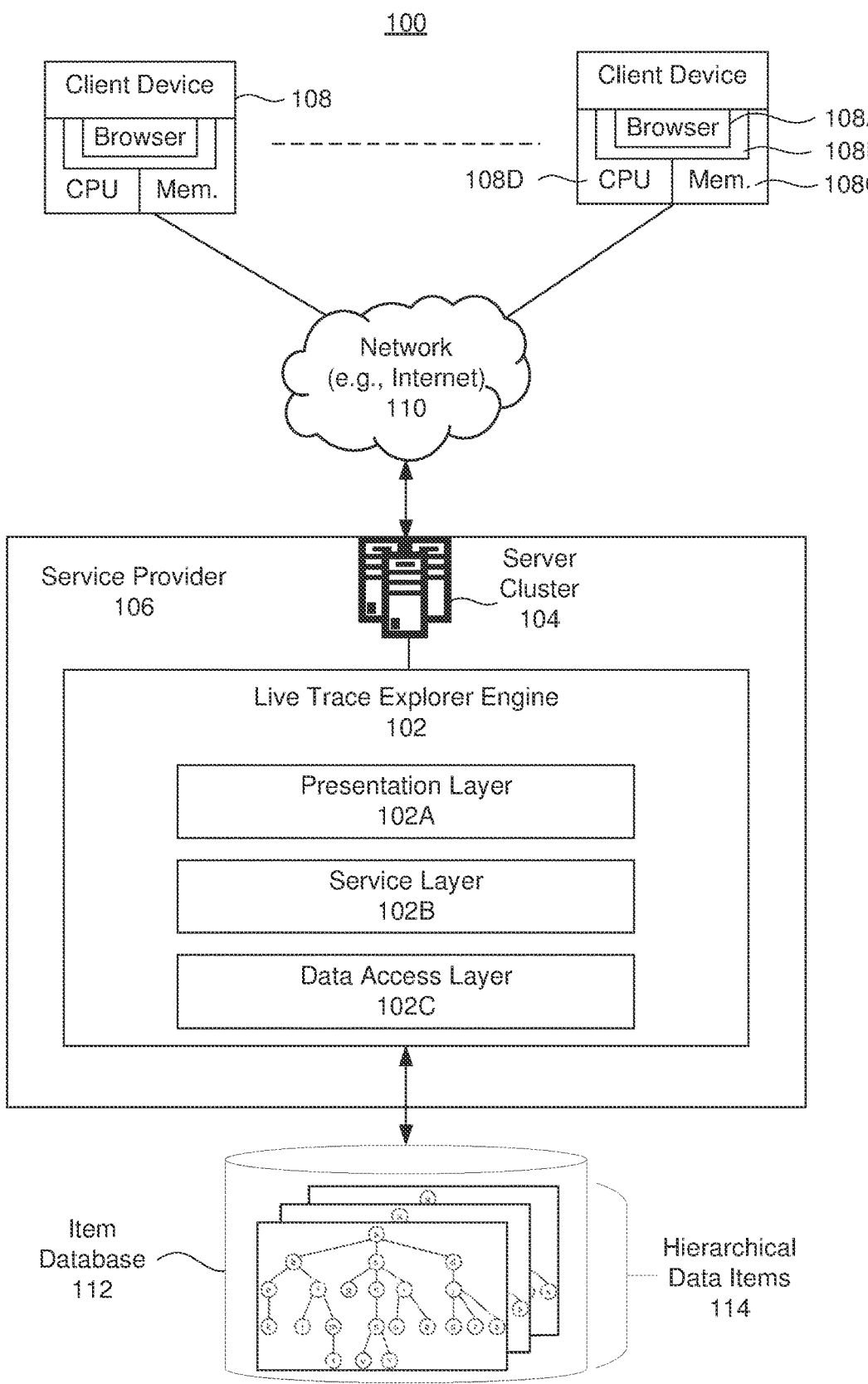
FIG. 1 is a block diagram illustrating an exemplary system in which a live trace explorer engine may be implemented according to one example implementation.

The disclosed embodiments relate to an interactive graphical user interface for viewing and navigating among sets of hierarchical data items. The following description is presented to enable one of ordinary skill in the art to make and use the invention and is provided in the context of a patent application and its requirements. Various modifications to the disclosed embodiments and the generic principles and features described herein will be readily apparent. The disclosed embodiments are mainly described in terms of particular methods and systems provided in particular implementations. However, the methods and systems will operate effectively in other implementations. Phrases such as "implementation" and "embodiment" may refer to the same or different embodiments. The embodiments will be described with respect to systems and/or devices having certain components. However, the systems and/or devices may include more or less components than those shown, and variations in the arrangement and type of the components may be made without departing from the scope of the invention. The disclosed embodiments will also be described in the context of particular methods having certain steps. However, the method and system operate effectively for other methods having different and/or additional steps and steps in different orders that are not inconsistent with the exemplary embodiments. Thus, the disclosed embodiments are not intended to be limited to the embodiments shown, but is to be accorded the widest scope consistent with the principles and features described herein.

The disclosed embodiments provide a live trace explorer engine for improving requirements management with live traceability across a development project to aid in building the next generation of complex products. Live traceability refers to the tracking and display of dynamic requirements information in substantially real-time. The live trace explorer engine converts static requirement documents into interactive requirements management across engineering teams and activities by creating and displaying an interactive diagram of a project in development as defined in a database, and uses a stored data item hierarchy and relationships between the data items to provide a high-level overview of the problem areas of the system.

The live trace explorer engine displays to a user a visual representation, called the live trace explorer, of the relationships between development phases and testing phases of a project and associated hierarchical data items. The live trace explorer comprises a first set of one or more requirement containers representing a plurality of development phases or streams of a project, and a second set of one or more test containers representing a plurality of test phases or streams for the project, where the requirement containers have a related test container. Each of the requirement containers contain a grouping of one or more of the hierarchical data items that belong to the represented development phase. Each of the test containers include a grouping of the hierarchical data items that belong to the represented test phase. A first set of edges link adjacent requirement containers together, and a second set of edges link the requirement containers to the related test containers. The edges are displayed with an indication of a percentage of relationships assigned to the edge that are suspect, and/or a total number of suspect relationships assigned to that edge. The live trace explorer further displays filter controls and navigation controls. The filter controls enable a user to filter which of the groupings of the hierarchical data items are displayed. A navigation control is displayed within each of the containers to enable the user to navigate to the hierarchical data items within a selected container, including navigating to the hierarchical data items that have a suspect relationship.

The live trace explorer engine enables the user to identify where gaps in misalignment exist across requirements levels and related test cases for early detection and correction to avoid rework and costly delays. The live trace explorer engine ensures that design changes are identified early and addressed quickly across all user groups to streamline compliance. Accordingly, the live trace explorer improves the ability of the computer to display information and interact with the user, which improves the functioning of the basic display function of a computer system.

FIG. 1 is a block diagram illustrating an exemplary system 100 in which a live trace explorer engine may be implemented according to one example implementation. The live trace explorer engine 102 is run on a server cluster 104 of a service provider 106 that provides software services to one or more client devices 108 over a network 110. In one example implementation, the service provider 106 may provide requirements and traceability management services, content management services, quality management services, or a combination thereof, to users of client devices 108. The service provider 106 may be implemented, for example, as a software-as-a-service (SAAS), a platform-as-a-service (PAAS), or an infrastructure-as-a-service (IAAS). In one implementation, the server cluster 104 may be implemented as a single-tenant or a multi-tenant cloud architecture.

The server cluster 104 represents a group of server computers working simultaneously. Compute resources utilized by the server cluster 104 may comprise, memory, databases, storage, analytics, networking, software and intelligence. For example, the server cluster 104 may include computer-readable media and storage devices (e.g., flash memory, hard drive, optical disk drive, magnetic disk drive, and the like) containing computer instructions that implement the functionality of the live trace explorer engine 102 when executed by a processor. The server cluster 104 further includes network communication interfaces for network communication.

Users of the client devices 108 (also referred to as "clients") access and interact with the live trace explorer engine 102 via a browser 108A, which is a computer program for displaying and navigating between web pages. The browser 108A may be a standalone application or a component of an application. The client devices 108 include a display device 108B on which the browser is displayed, a memory 108C, and a processor 108D. The client devices 108 may further include other typical hardware components (not shown) such as input devices (e.g., keyboard, pointing device, microphone, etc.), output devices (e.g., speakers and the like), and wired or wireless network communication interfaces for communication.

The network 110 over which the client devices 108 access the live trace explorer engine 102 comprises one or more arrangements of the type known in the art, e.g., local area networks (LANs), wide area networks (WANs), metropolitan area networks (MANs), intranets, and Internet(s).

The service provider 106 maintains or otherwise has access to a data source, such as an item database 112, containing hierarchical data items 114. The hierarchical data items 114 (also referred to as "artifacts") can be used to capture requirements at all stages of the requirements management process, from the initial gathering of requirements to the final verification of the requirements. The hierarchical data items 114 can be used to communicate requirements to users, to track the progress of the requirements, and to ensure that the requirements are complete. The item database 112 containing the hierarchical data items 114 may comprise a relational database (e.g., MySQL or SQL Server) in one implementation.

In some implementations, the item database 112 may store the hierarchical data items 114 according to a particular format or model. For example, the V-Model, also known as the Verification and Validation Model, is a software development process model that is used to represent sets of hierarchical data items 114. As used herein, the term data items or artifacts refers to any type of digital information used for a development project (e.g., the design and implementation of a product, service, or system).

The V-Model emphasizes the relationship between different development phases and corresponding testing phases. For example, each stage of development is typically required to have a relationship with an associated testing phase, ensuring that defects are caught and addressed early in the process, and another relationship with the next development phase that defines the development in further detail. The V-Model also keeps track of the traceability between each development phase and its corresponding testing phase, ensuring that the final system meets the initial requirements.

An example set of hierarchical development phase requirements may start with user requirements, which are used to develop system requirements, and the system requirements may be used to further develop system components or a system architecture. Each of these requirement phases may have a related test phase. Each test phase may perform validation or verification procedures that are used together for checking that a product, service, or system meets requirements and specifications and fulfills its intended purpose. Validation is the assurance that the product, service, or system meets the needs of the customers. Verification is the evaluation of whether or not the product, service, or system complies with a regulation, requirement, specification, or other imposed condition.

In further detail, the stored hierarchical data items 114 may be organized as an ordered tree, where nodes of the tree may represent the various types of data items, and edges between the nodes may represent various types of relationships between those items. There is a single data item that is the root of the tree, and each of the data items has an ordered list of zero or more child data items. Each of the data items, except for the root item, has one parent data item. A data item is a descendant of another data item if the data item is a child of the other data item or if it is a descendant of a child of the other data item.

Each of the data items may have an item type, indicating what kind of item is represented, e.g., a customer requirement, a system requirement, a system component, a test case, and the like.

A relationship is an ordered pair of data items, where one data item in the pair is the source item of the relationship, and the second item is the target data item of the relationship. Each relationship has a relationship type, indicating the kind of relationship represented. In one implementation, the relationship types may include satisfied-by, verified-by, validated-by.

The type of data item defines which types of relationships the data item must have for the data item to be considered "covered" by the target data item. For example, a relationship for a customer requirement data item could defined to be covered if the customer requirement data item is the source of a satisfied-by relationship with a child requirement data item as well as the source of at least one validated-by relationship with a related test case. A system requirement data item could be defined to be covered if system requirement data item is the source of at least one verified-by relationship a related test case. The system requirement could also include a satisfied-by relationship with a child system component data item.

Conventional requirements management tools may enable users to view information pertaining to the hierarchal data items 114, including a status of the relationships defined between the hierarchal data items 114. However, if an engineer changes, adds, or deletes, a data item, any relationships defined for that data item is automatically changed from good/present to suspect/missing. The engineer must then inspect the two data items related by a suspect/missing relationship, and if they determine that the items satisfy the relationship, the engineer can "clear" the suspect/missing flag to change the status to good/present.

As described further above, one drawback with such tools is that most of the information pulled from the database about the data items and relationships are shown in reports. This can be problematic as the database may store hundreds of thousands of data items and the data is dynamic in nature meaning that the data is constantly changing. The unintended result of this process is that critical functions such as requirements management and traceability, validation, verification, and compliance may include information gaps, defects, missed requirements, and significant manual effort to correct.

According to the disclosed embodiments, the live trace explorer engine 102 is an application that creates and displays on client device 108 an interactive graphical user interface (GUI) showing a diagram of the data item hierarchy and data item relationships to provide a high-level overview of the problem areas of the system. A user of client device 108 can then interact with the diagram to navigate among the hierarchical data items 114 and more easily determine which relationships are causing the problems, so that those items can be modified and fixed more efficiently compared to past methods.

In one embodiment, the live trace explorer engine 102 may comprise a number of software components such as software servers or services that are packaged together in one or more software applications. For example, the live trace explorer engine 102 may include a presentation layer 102A, a service layer 1028, and a data access layer 102C.

In operation, the server cluster 104 accepts API query requests from the client devices 108, forwards the request to the live trace explorer engine 102 and the data access layer 102C fulfills the queries using the item database 112. The service layer 102B visualizes the hierarchical data items 114 and associated relationships returned from the query, and the presentation layer 102A returns the visualization as one or more webpages in a response to the requesting client device 108.

In further detail, the presentation layer 102A may provide a model view controller framework that formats and presents information to the user in an interactive graphical user interface (GUI). In one embodiment, the presentation layer may be written in JavaScript, HTML 5, CSS, and/or Angular 4. The presentation layer 102A includes rest APIs for front-end server communication and may further include a graphical subsystem for implementing a lightweight browser-based user interface that displays the hierarchical data items as described with respect to FIG. 3. The presentation layer 102A also handles user input, such as clicks, taps, and keystrokes.

The service layer 102B may be responsible for implementing core functionality of the live trace explorer engine 102. The service layer 1028 may be written in a language that is efficient and scalable, such as Java or C #. The service layer 102B may further provide security related features for the live trace explorer engine 102.

The data access layer 102C may implement a runtime for fulfilling client queries with the sets of hierarchical data items 114 from one or more data sources, such as item database 112. The data access layer 102C may be written in a language that is efficient and can handle large amounts of data, such as an object-relational mapping tool for the Java programming language (e.g., Hibernate ORM™). Hibernate ORM provides a framework for mapping an object-oriented domain model to a relational database. In an alternative implementation, the data access layer 102C may be written in SQL.

In the embodiment shown, the live trace explorer engine 102 is implemented as software components executed by the server cluster 104. However, in another embodiment, the live trace explorer engine 102 may be implemented as an application that is downloaded and run on the client devices 108. Although the live trace explorer engine 102 is shown as a monolithic application, the functionality of the live trace explorer engine 102 may be implemented as a number of separate modules/components.

FIG. 2 is a flow diagram 200 illustrating operations of the live trace explorer engine according to one implementation. In operation, the live trace explorer engine 102 monitors hierarchical data items from a data source (e.g., item database 112) that capture requirements from a development phase and a test phase of a project (block 202). The project can be representative of any product, system, or service that is for use by customers. The hierarchical data comprises a hierarchy of requirement data items and test case items, where the requirement data items are validated or verified based on sets of relationships between the hierarchical data items.

Responsive to detecting which ones of the hierarchical data items have changed, the live trace explorer engine 102 determines which ones of the relationships are suspect based on the changes (block 204). In one example implementation, live trace explorer engine 102 may determine which hierarchical data items have changed based on monitoring database update operations (e.g., add, change, and delete) performed on the hierarchical data items by users, which may be different or the same as users of the client devices 108.

The live trace explorer engine 102 combines the hierarchical data items into groups based on data item types, where the data item types may include, for example, a customer requirement, a system requirement, a system component, and a test case (block 206).

The live trace explorer engine 102 determines or measures what percentage of the hierarchical data items in each of the groups have suspect relationships (block 208). The live trace explorer engine 102 may calculate the percentage by using the formula (suspect relationships divided by the total number of relationships)×100. For example, assuming that an example group of data items has a total of 50 relationships with 26 suspect relationships and 24 good relationships, the percentage of suspect relationships is 26/(50)×100=52%.

Figure 3:
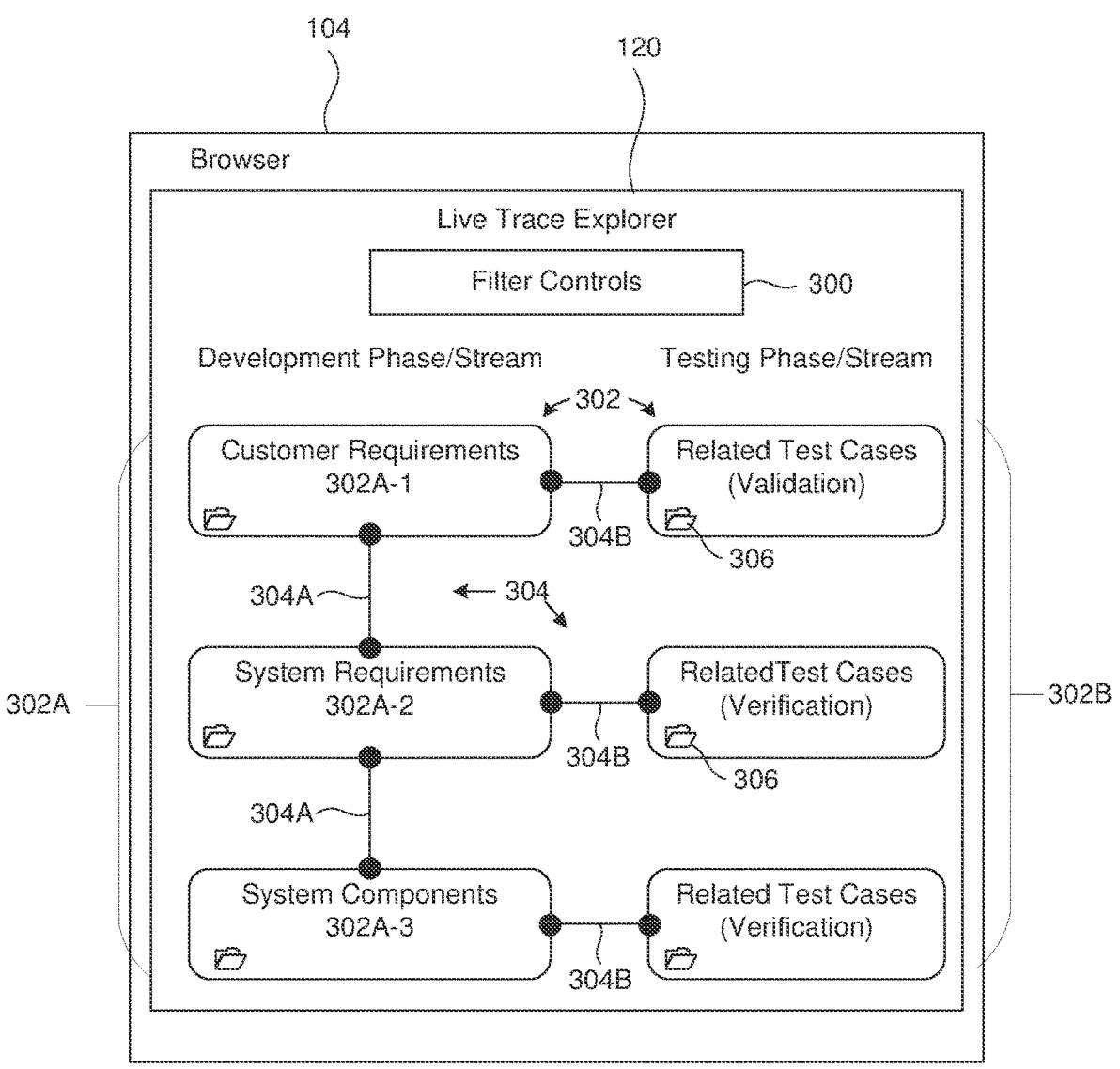
FIG. 3 is a diagram illustrating an example GUI displayed by the live trace explorer engine according to one implementation.

The live trace explorer engine 102 then displays on a display 108B of client device 108 of a user, an interactive graphical user interface (GUI) showing the project in development as defined by the hierarchical data items and sets of relationships between the data items (block 210), as shown in FIG. 3.

FIG. 3 is a diagram illustrating an example GUI displayed by the live trace explorer engine according to one implementation. The GUI displayed by the live trace explorer engine 102 is referred to herein as live trace explorer 120 and is displayed within browser 108A to provide users with requirements management and live traceability.

According to the disclosed embodiments, the live trace explorer 120 displays containers 302, which refer to graphical or visual elements used to group and hold other UI elements together. The live trace explorer 120 also displays filter controls 300 that filter what type of containers 302 are displayed based on user interactions, and displays navigational controls 306 to enable the user to navigate and zoom into details about each of the containers 302 based on user interactions.

The containers 302 are used to represent and contain respective groups of the hierarchical data items 114. According to one aspect, the containers 302 are displayed in at least two sets. A first set comprises requirement containers 302A representing requirement items of a development phase or stream. A second set of the containers comprises test containers 302B representing test case items of a testing phase or stream. The first set of requirement containers 302A includes a root requirement container 302A-1 and one or more child requirement containers 302A-1 and 302A-3.

The two sets of requirement containers 302A and test containers 302B are displayed adjacent to one another. For the requirement containers 302A in the first set, there may be a corresponding test container 302B in the second set. In the specific embodiment shown, the first set of requirement containers 302A are displayed in one column and the test containers 302B are displayed in a second column adjacent to the first column.

However, the two sets of containers 302A and test containers 302B may be displayed with any type of spatial orientation to one another. For example, the requirement containers 302A and the test containers 302B may be displayed along adjacent columns, adjacent rows, arcs, curves, geometric patterns (e.g., a "V" formation), or combinations thereof.

Annotated Edges

Annotated edges 304 are displayed between pairs of the containers 302, with each of the annotated edges 304 indicating a type of relationship between the hierarchical data items in a respective pair of the containers 302, and also indicating a percentage of the hierarchical data items in the pair of the containers 302 that have the suspect relationships. The requirement containers 302A are shown sharing an annotated edge 304A with a child requirement container 302A-2 or 302A-3, and sharing an annotated edge 304B with a related or adjacent test case container 302B.

The annotated edges 304A between pairs of the requirement containers 302A represent a satisfied-by relationship. The annotated edges 304B between the root requirement container 302A-1 and a test case container 302B represent a validated-by relationship. The annotated edges 304B between child requirement containers 302A-2 or 302A-3 and a test case container 302B represent a verified-by relationship.

Figure 4A:
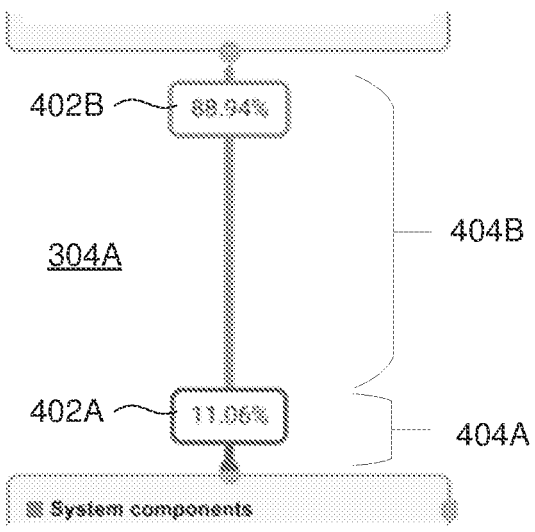
FIGS. 4A-4C are diagrams illustrating different types of annotated edges between pairs of containers in further detail.
Figure 4B:
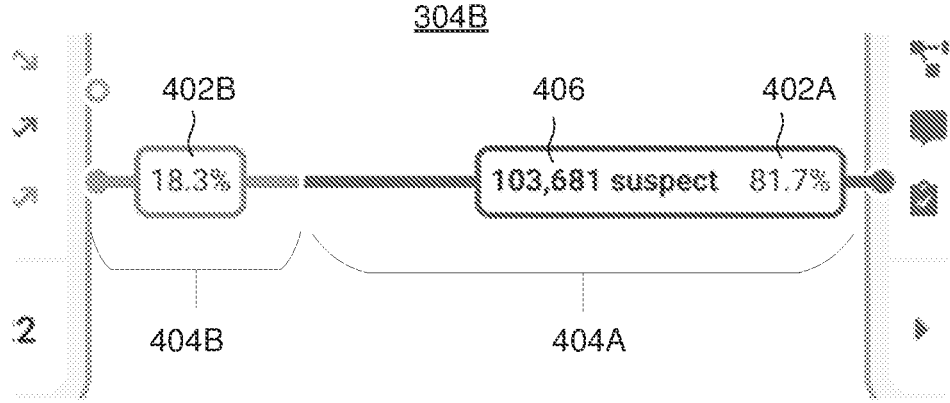
Figure 4C:
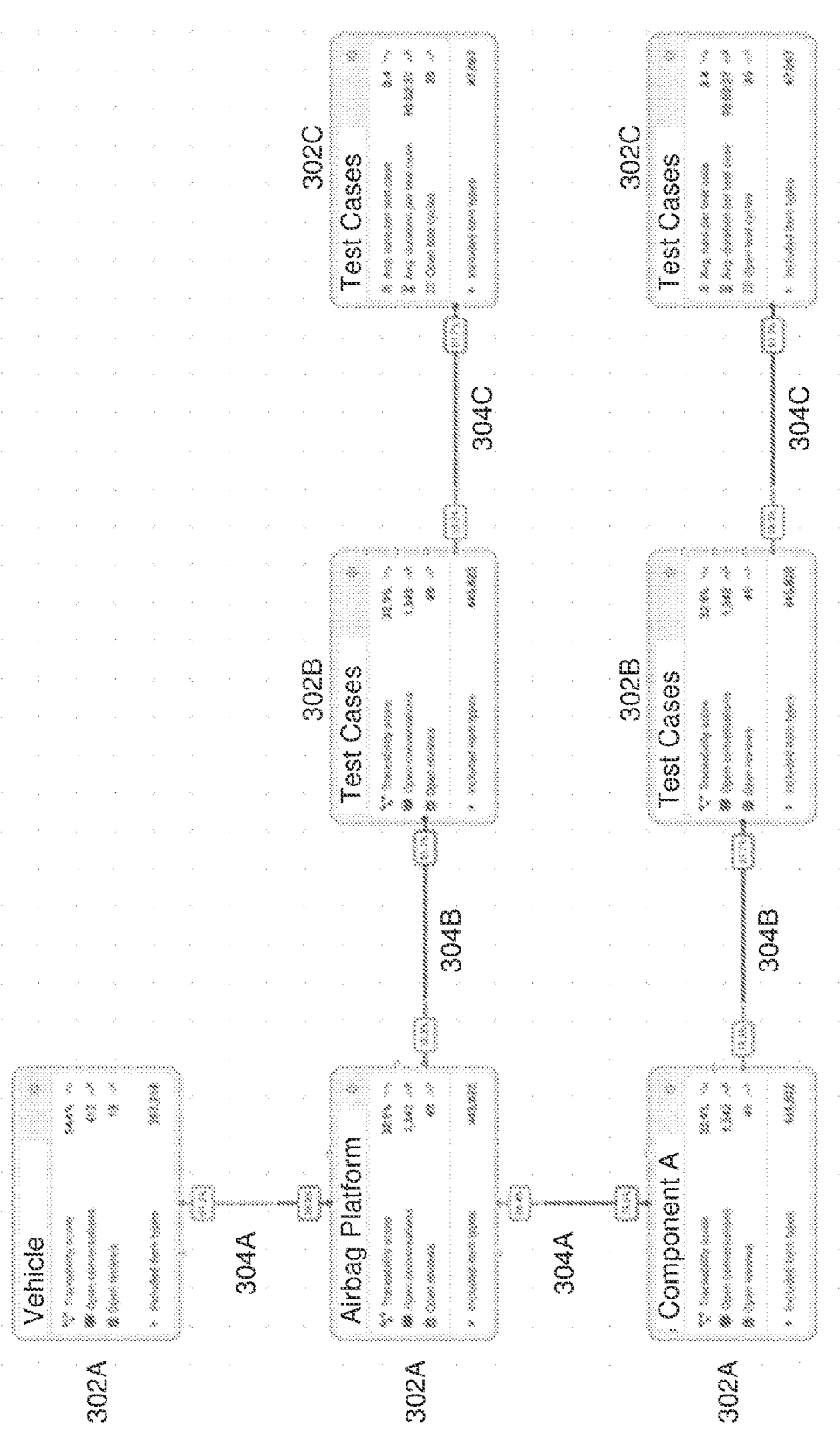

FIGS. 4A-4C are diagrams illustrating different types of annotated edges 304 between pairs of containers in further detail. In the implementation where the containers 302 are displayed in a two column format, FIG. 4A shows the annotated edge 304A representing a satisfied-by relationship, and FIG. 4B shows the annotated edge 304B representing a verified-by relationship or a validated-by relationship. FIG. 4C also shows an embodiment where more than one set or columns of test containers 302B and 302C are displayed with annotated edge 304B therebetween. FIG. 4C shows the annotated edges 304A between pairs of the requirement containers 302A, the annotated edges 304B between pairs of the requirement containers 302A and the test containers 302B, and the annotated edges 304C between pairs of test containers 302B and test containers 302C.

In one implementation, the annotated edges 304 are displayed with annotations comprising additional textual and/or graphical information summarizing a status or a quality of all relationships assigned to the respective annotated edge. According to a further aspect of the disclosed embodiments, the annotated edges 304 summarize the status of all relationships assigned to that edge by displaying a first percentage 402A of the hierarchical data items that have suspect relationships, and optionally a second percentage 402B of the hierarchical data items that have relationships that are not suspect or otherwise good.

In one implementation, the first and second percentages 402A and 402B may be displayed as a number value. Additionally or alternatively, the first and second percentages 402A and 402B may be displayed by segmenting the annotated edges 304 into two sections, where a length of a first section 404A represents the percentage of the relationships that are suspect, and a length of a second section 404B represents the percentage of the relationships that are not suspect or good. Sections 404A and 404B may be further displayed in different colors, e.g., the first section 404A may be red in color to show the suspect relationships, and the second section 404B may be green in color to show the good relationships. Any color or shading combinations can be used. Alternatively or additionally, the annotated edges 304 may further display a total number value of suspect relationships 406 (as shown in FIG. 4B) and/or the total number of all relationships (not shown). Although the annotated edges 304 are shown displaying textual and/or graphical information directly on or within the annotated edges 304, the textual and/or graphical information may be displayed adjacent to the annotated edges 304 in other implementations.

Annotated Containers

Figure 4D:
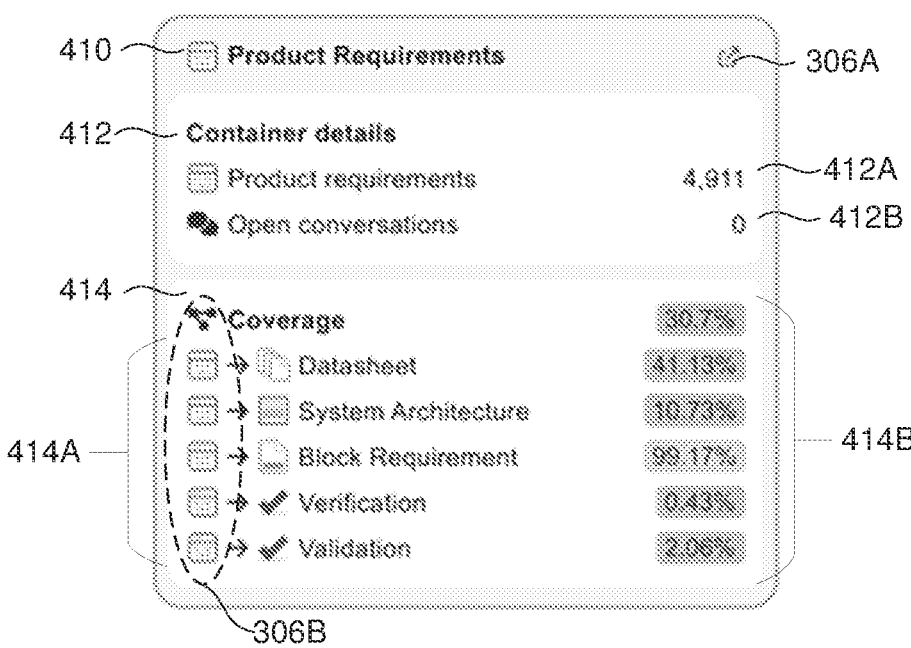
FIG. 4D is a diagram illustrating the live trace explorer displaying the containers with annotations showing a summary of informational details about respective requirement containers.

FIG. 4D is a diagram illustrating that the live trace explorer 120 may display the containers 302 with annotations showing a summary of informational details about the respective requirement containers. The informational details displayed in the container(s) 302 may include a data item type label 410, a container details section 412, and a coverage section 414. The data item type label 410 indicates the types of data items grouped in the container 302.

For each of the requirement containers 302A, the live trace explorer engine 102 may display in the container details section 412: i) a total number 412A of all data items that are visible, ii) optionally a total number of all requirement data items that are not visible (not shown); and iii) optionally a total number 412B of open conversations about the container 302 or the requirement data items. In this example, the container 302 groups product requirement data items, and the container details section 412 indicates there are 4911 product requirement data items grouped in that container with zero open conversations.

The live trace explorer engine 102 may display in the coverage section 414 different requirement data items types 414A and an indication of internal relationship coverage 4148 of each of the different requirement data item types 414A. A relationship is internal to a container if both the source and target of the relationship are assigned to that container.

The relationship coverage 414B for the various types of data items are shown in this example as a percentage of internal relationships that are good, or alternatively the percentage of internal relationships that are suspect. Different colors may be displayed for the relationship coverage 4148 depending on how the percentage values compare to predefined percentage thresholds. For example, for the percentage values of internal relationships that are good, any percentage values of 80% or greater may be displayed in one color (green), while any percentage values less than 80% may be displayed in another color (red).

Additionally or alternatively, the coverage section 414 may display i) the total number of each of the different requirement data item types, ii) a count of all visible data items based on their relationship status (missing coverage relationship, suspect coverage relationship, not covering any items), iii) a count of relationships of visible requirement data items that are not contained in an annotated edge (i.e., relationships with an item that is not visible).

For each of the test containers 302B (not shown), the live trace explorer engine 102 may display in the container details section 412: i) a total number of all visible test cases that are assigned to a test plan, ii) a total number of visible test cases whose most recent test has passed; and/or iii) a total number of visible test cases that do not have a relationship with a data item in the related requirements container 302A. If user selects "full details" using navigational control 306A, a percentage is displayed of visible test cases whose most recent test run has a given test run status. In one example, the test run status may include "pass", "fail", "blocked", "in progress", "not run", or "not assigned to a test plan".

Navigational Controls

As shown in FIG. 3, the live trace explorer 120 displays navigational controls 306 within the containers 302 that enables the user to navigate to the hierarchical data items in a selected container, including the hierarchical data items that have suspect relationships. In one implementation, there are at least two types of navigational control 306. Referring to FIG. 4D, navigational control 306A displays full details of the container 302 and may comprise a hyperlink or link, which when clicked by the user, opens a new window, tab, or pane that displays the further details of the content associated with the container 302. Clicking the navigational control 306A allows the user to toggle a container 302 between full detail view and summary view.

Navigational control 306B is displayed in the coverage section 414 and may comprise a treeview control, shown as a folder icon and/or a tree icon, which when clicked by the user, displays a hierarchical structure of the data items contained therein. The folder icon represents a node in a tree structure, and the other nodes in the tree represent subfolders and data items contained in that folder. Users can expand and collapse nodes in the treeview control to view the subnodes. Users can select a specific node in the treeview control to view the data items the node contains. The treeview control can be used to navigate (e.g., zoom in and out) through the hierarchical structure of data items.

Alternatively or additionally navigational control 306 can also be implemented as accordion controls that allows users to collapse and expand individual sections of the data items and/or drilldown controls allow users to navigate through the hierarchical data items by drilling down into individual nodes.

In one implementation, the containers 302 can encapsulate event handling logic. For instance, the containers 302 may be configured to capture events such mouse clicks and display child data items as needed.

Filter Controls

Figure 5:
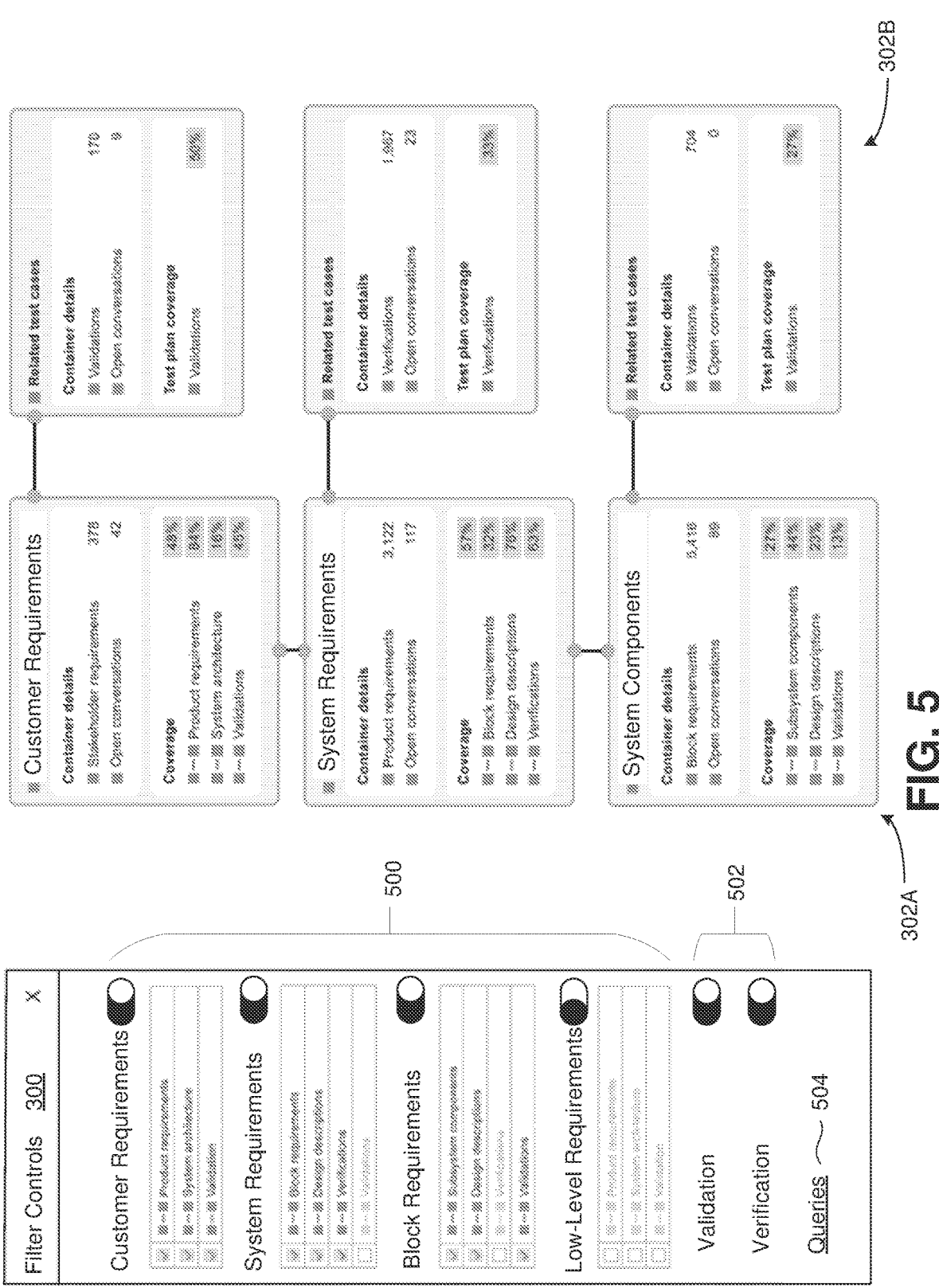
FIG. 5 is a diagram illustrating example filter controls displayed on the live trace explorer that enable a user to filter which of the groups of the hierarchical data items are displayed.

FIG. 5 is a diagram illustrating example filter controls 300 displayed on the live trace explorer 120 that enable a user to filter which of the groups of the hierarchical data items are displayed. In one example implementation, the filter controls 300 may be displayed in a window or pane adjacent to the diagram of the sets of requirement containers 302A and test containers 302B.

Responsive to user input with the filter controls 300, the filter controls 300 modify what information is shown the diagram. The filter controls 300 may include a data item type filters 500, relationship type filters 502, and a query filter 504 that can be applied to the diagram. Each of the data item type filters 500 identifies a set of data item types, and all data items whose type is one of the types in the item filter may be added or removed from the diagram by the user toggling the selected data item type filters 500 on or off.

The relationship type filters 502 identify a set of relationship types (e.g., validated-by, verified-by, and the like), and all relationships whose type is one of the types in the item filter 502 are added or removed from the diagram by the user toggling the selected relationship type filter 500 on or off.

The query filter 504 specifies a database query, and all data items that do not match the query are removed from the diagram. In one implementation, the query filter 504 may comprise a command-line user interface for the user to form the query. In another implementation, the query filter 504 may be a link to another window or pane in which the user can construct and execute the query.

Additionally or alternatively, the user may invoke filter operations by interacting with the containers 302. For example, the user can collapse two adjacent requirement containers 302A into a single container 302A (e.g., by dragging and dropping), which will automatically collapse the corresponding two adjacent test case containers 302B. If a requirement container 302A has more than one root child item, the requirement container 302A is split into two adjacent requirement containers 302A. If there are more than two root child data items in the requirement container 302A, the user may specify which set of adjacent root child data items go into which of the two requirement containers 302A (the leftmost root child data items are placed in the upper requirement container).

The user may select a set of data items and move the set from one container 302 in the diagram to another container in the diagram. When a data item is moved to another container, all child data items of that data item are automatically moved as well.

If a container 302 contains multiple data items, the user can select to hide a subset of the data items. This removes those data items from the detail information of the container, and removes any relationships with those data items from the annotated edges 304 connected to the container. If a container 302 contains hidden data items, the user can select to view (unhide) one or more of the hidden data items.

Container Full Detail View

Figure 6A:
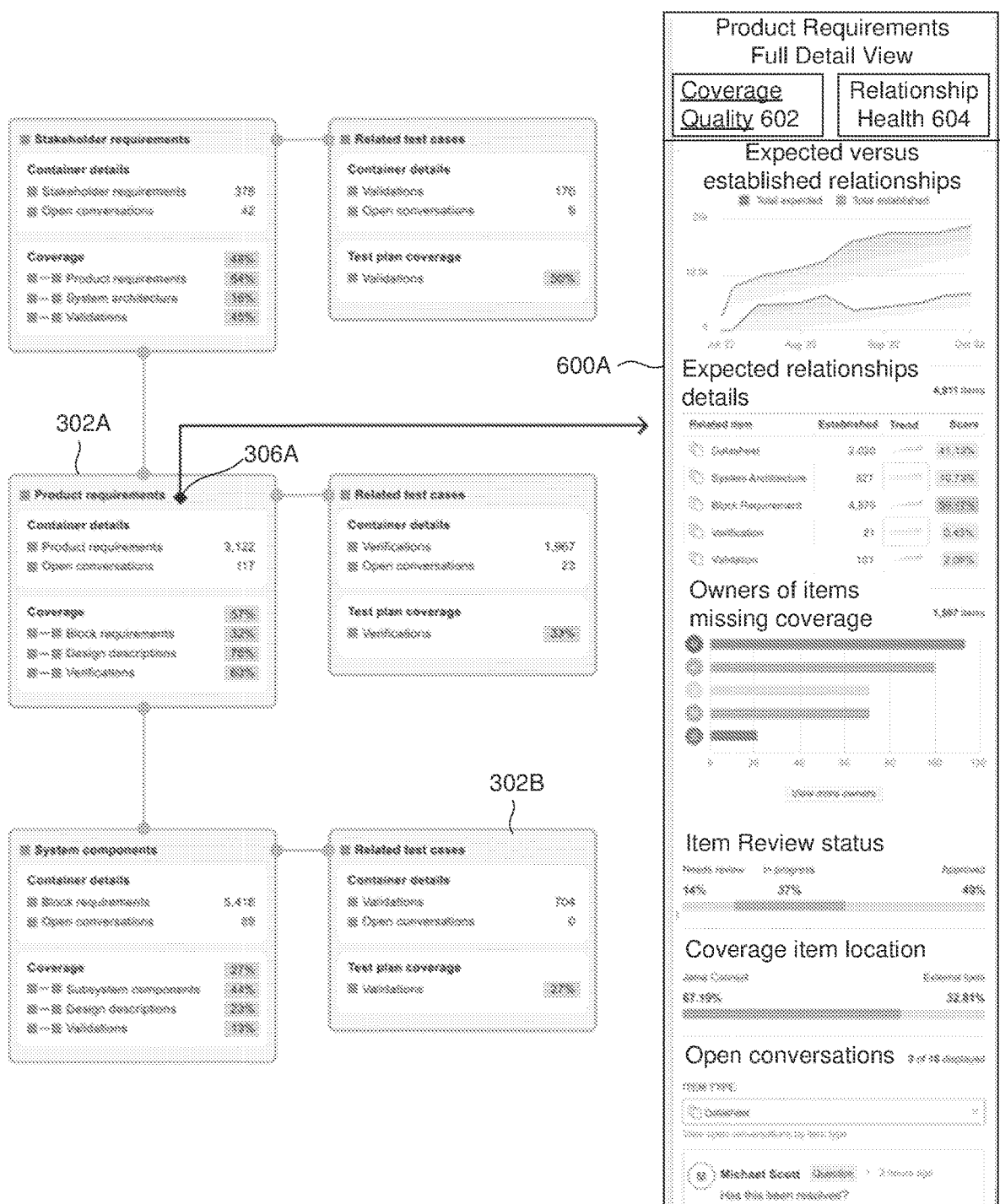
FIGS. 6A-6D are diagrams illustrating various implementations of displaying detailed information about a selected container and navigating to details about the selected container.
Figure 6B:
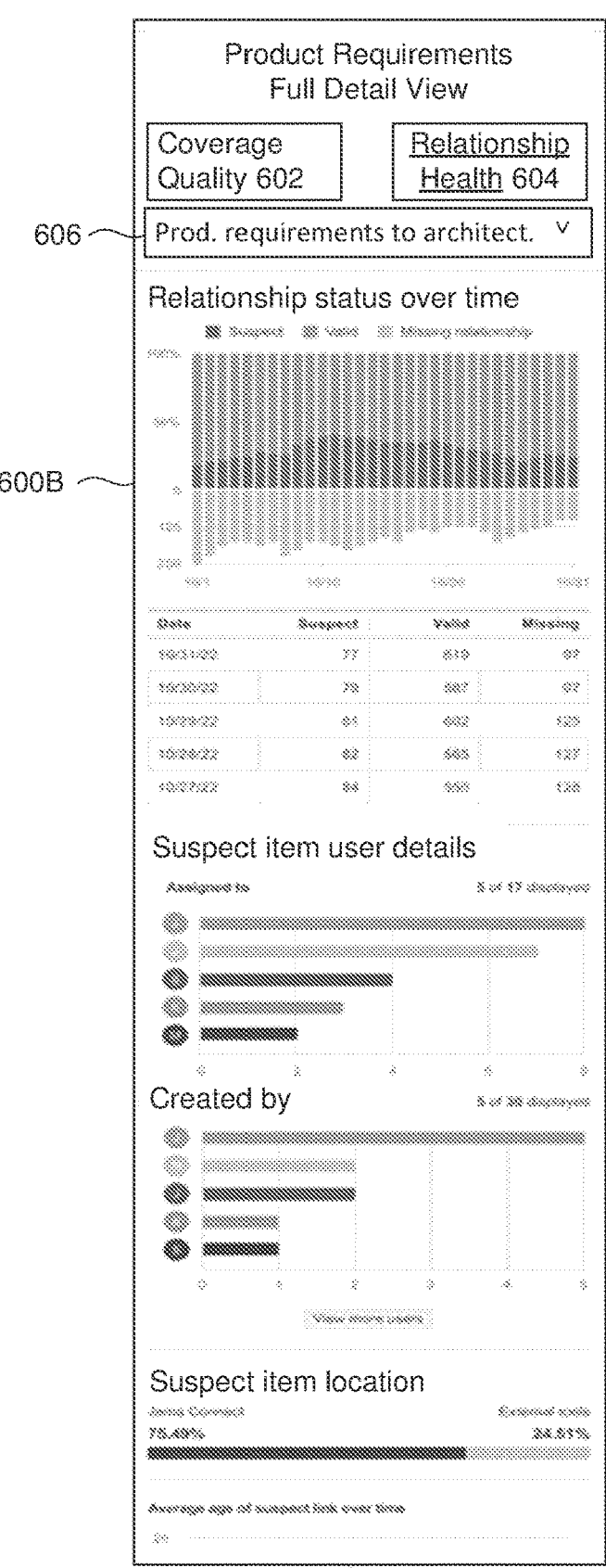

FIGS. 6A-6D are diagrams illustrating various implementations of displaying detailed information about a selected container. FIG. 6A illustrates pane 600A displaying a full detail view of a requirements container in response the user clicking navigational control 306A, which can be considered a type of zoom control. According one implementation, the product requirements full detail viewed may include view options for showing detailed content regarding coverage quality 602 or relationship health 604. FIG. 6A shows the content details related to coverage quality 602, while FIG. 6B shows the content details related to relationship health 604.

Responsive to the user clicking on coverage quality 602, example content details associated with the container 302 that may be displayed in pane 600A include: i) expected versus established relationships over time, ii) expected relationship details with trends, iii) owners of items having missing coverage, iv) data item review status (e.g., percentage that needs review, percentage in progress, and percentage approved), v) coverage item location (e.g., internal to the live trace explorer engine 102 or external), and vi) open conversations between users regarding the container.

Referring to FIG. 6B, responsive to the user clicking on relationship health 604, example content details associated with the requirements container 302A that may be displayed in pane 600B include: i) a pull down menu 606 for the user to select a path for which relationship health details will be shown, ii) relationship status over time (e.g., the number of suspect, valid, and missing relationships), iii) suspect item user details (i.e., who owns the items with suspect relationships), iv) created by (i.e., the creator of the items), and v) suspect item location (e.g., internal to the live trace explorer engine 102 or external).

Figure 6C:
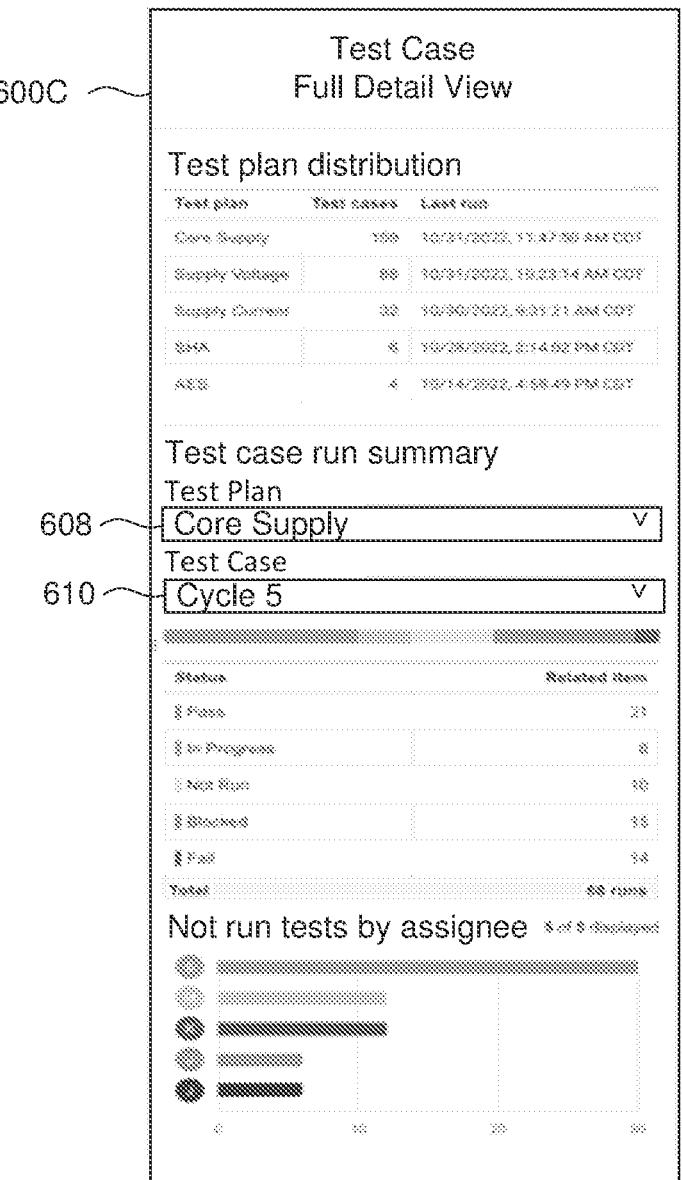

FIG. 6C illustrates pane 600C displaying a full detail view of a test container in response the user clicking navigational control 306A. Example content details associated with test container 302B that may be displayed in pane 600C include: i) test plan distribution (e.g., which test plans are assigned to which test cases), ii) a test case run summary, which may include a pull down menu 608 for the user to select a given test plan, and a pull down menu 610 for the user to select a given test case within the selected test plan, and iii) test not run by assignee.

Figure 6D:
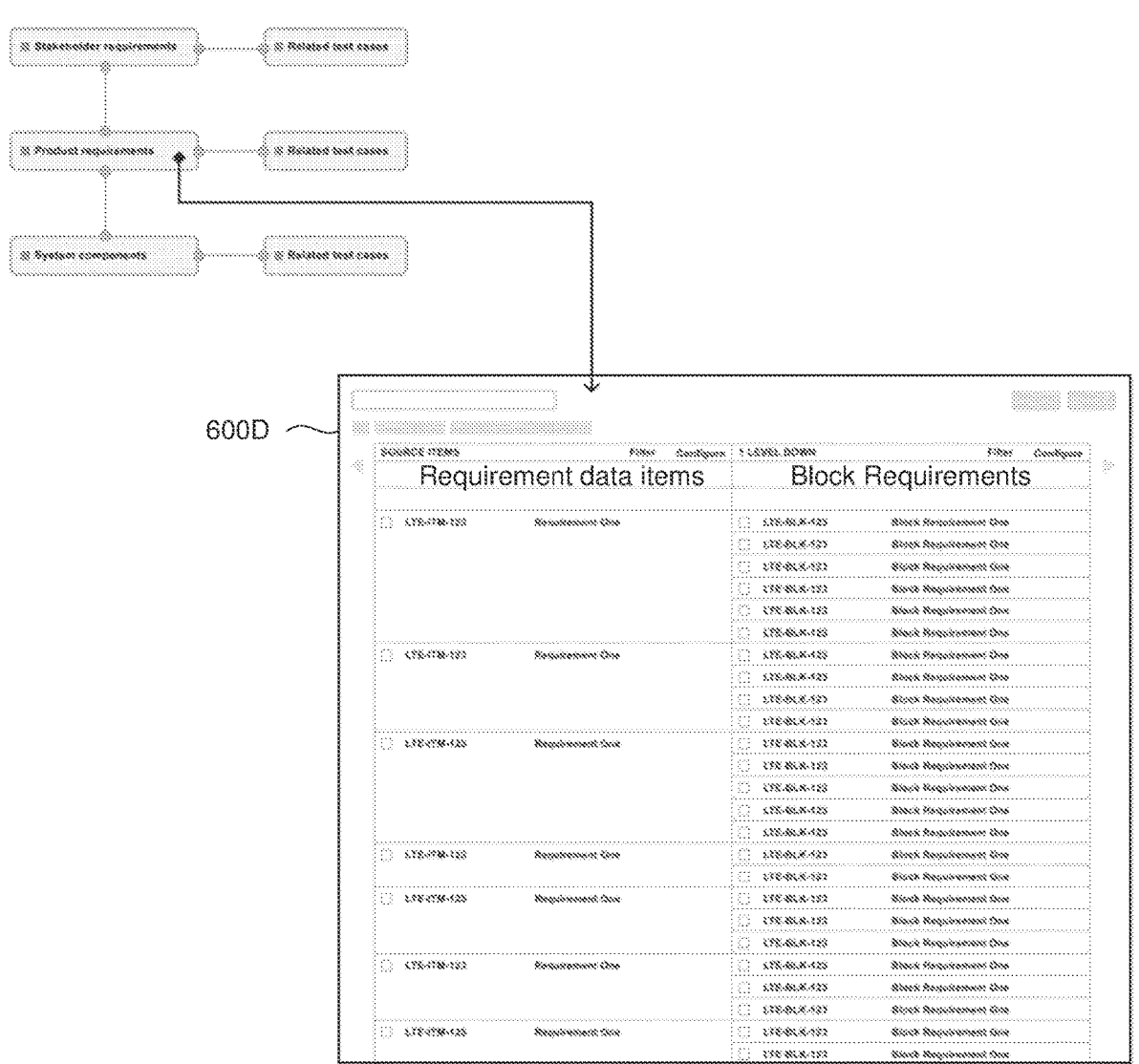

FIG. 6D is a diagram illustrating an implementation for displaying detailed information about a selected container for enhancing coverage and correctness for the user to clear suspect data items and/or relationships. Responsive to the user clicking on suspect data item or relationship in a given container 302, pane 600D displays source level data items associated with the suspect data item or relationship. A list of requirement data items is show with associated block requirements. A user may click a check box next to a suspect data item to clear the suspect data item.

FIG. 7 is a flow diagram illustrating a process 700 performed by the live trace explorer engine 102 to enable a user to clear a suspect data item or relationship. The process my begin receiving filter control 300 settings from a user that control what groups of data items are displayed in a set of one or more requirement containers (block 702).

The live trace explorer engine 102 displays in the live trace explore 120 requirement containers 302A and information about the requirement data items and all direct and indirect child data items (block 704).

The live trace explorer engine 102 displays one or more test containers 302B adjacent to the set of requirement containers 302A, where the test containers 302B contain all test case data items that have a relationship to any of the requirement data items in the requirement containers 302A (block 706).

The live trace explorer engine 102 optionally receives filter control 300 settings from the user that adjusts what is displayed in the containers 302 by specifying types of data items and types of relationships that should be ignored (block 708). The process continues at block 704.

The live trace explorer engine 102 receives navigational control from a container of interest that adjusts the group of data items, which includes either zooming in and out on a child data item in the container, moving the child data item to a specified location in the group or removing the child data item from the group (block 710). The process continues at block 704. Zooming in and out of summary and detail views of the containers and data items contained by the containers provides live traceability.

Responsive to receiving user selection of a section in the container of interest containing a set of suspect data items, the live trace explorer engine 102 displays the suspect data items in a detailed view that can be directly edited by the user (block 712).

The live trace explorer engine 102 receives user changes to the suspect data items in the detailed view that satisfied their relationships and user input that clears the suspect property on those relationships (block 714).

According to aspects of the disclosed implementations, the live trace explorer engine 102 provides information to the user in the live trace explore 120 relating to completeness of the relationship coverage in a given project. This includes whether each of the customer requirements covered by system requirements, whether each of the customer requirements are covered by test cases, and whether each of the system requirements are covered by test cases. The live trace explore 120 further provides users with information regarding i) the quality of traceability, i.e., how many relationships are suspect, ii) which test cases do not have a passing result, iii) provides team leads to determine which areas of the project have problems based on measurements of progress and who is responsible for clearing those problems, and iv) provides systems engineers a way to drill into details of a problem area in the project and to take action on particular data items causing problems.

A live trace explorer engine has been disclosed that is implemented as method and system for providing an interactive GUI for viewing and navigating among sets of hierarchical data items. The present invention has been described in accordance with the embodiments shown, and there could be variations to the embodiments, and any variations would be within the spirit and scope of the present invention. For example, the exemplary embodiment can be implemented as a cloud based tool, a downloadable application, a non-transitory computer readable medium (NCRM) storing software program instructions, or a combination thereof. Accordingly, many modifications may be made by one of ordinary skill in the art without departing from the spirit and scope of the appended claims.

We claim:

1. A non-transitory computer readable medium (NCRM) having stored thereon software instructions that, when executed by a set of one or more processors, are configurable to cause the set of one or more processors to perform operations that track and display dynamic requirements information of a project in substantially real-time, comprising:

monitoring hierarchical data items from a data source, the hierarchical data items comprising a hierarchy of requirement data items and a hierarchy of test case items, where ones of the hierarchy of requirement data items are validated or verified based on sets of relationships between the hierarchical data items;

responsive to detecting which ones of the hierarchical data items have changed based on database update operations, determining which ones of the sets of relationships are suspect based on the changes;

combining the hierarchical data items into groups;

determining what percentage of the hierarchical data items in each of the groups have suspect relationships;

and displaying on a display of a computing device of a user an interactive graphical user interface (GUI), comprising:

containers representing and containing respective groups of the hierarchical data items, the containers displayed in at least two sets adjacent to one another, where a first set comprises requirement containers representing the hierarchy of requirement data items and a second set comprises test containers representing the hierarchy of test case items, where for ones of the requirement containers, there is a corresponding test container in the second set;

annotated edges between pairs of the containers, ones of the annotated edges indicating a type of relationship between the hierarchical data items in a respective pair of the containers, and a percentage of the hierarchical data items in the respective pair of the containers that have the suspect relationships, wherein the percentage of suspect relationships is automatically recalculated in response to the database update operations such that the annotated edges are dynamically updated;

and a treeview control displayed within the containers that, responsive to user selection, displays a hierarchical structure of the hierarchical data items contained therein as nodes in a tree structure, wherein the treeview control enables users to expand and collapse the nodes to view subnodes and to select a specific node to view the hierarchical data items the specific node contains, and wherein the treeview control enables navigation through the hierarchical structure of the hierarchical data items to identify data items having the suspect relationships;

receiving user selection of a section in a container containing the hierarchical data items having the suspect relationships, displaying the hierarchical data items having the suspect relationships in a detailed view;

receiving user changes to the hierarchical data items having the suspect relationships in the detailed view;

and clearing a suspect property associated with the hierarchical data items having the suspect relationships based on the received user changes.

2. The NCRM of claim 1, further comprising displaying the annotated edges with additional textual or graphical information summarizing a status or a quality of the sets of relationships assigned to the respective annotated edge.

3. The NORM of claim 2, further comprising displaying in the annotated edges another percentage of the hierarchical data items in the respective pair of the containers that have relationships that are not suspect.

4. The NORM of claim 2, further comprising displaying the annotated edges with two sections, where a length of a first section represents the percentage of the sets of relationships that are suspect, and a length of a second section represents the percentage of the sets of relationships that are not suspect.

5. The NORM of claim 2, further comprising displaying the annotated edges with a total number value of suspect relationships in the respective pair of the containers.

6. The NORM of claim 1, wherein the first set comprise a root requirement container and one or more child requirement containers.

7. The NORM of claim 6, further comprising using the annotated edges between pairs of the requirement containers to represent a satisfied-by relationship; using the annotated edges between the root requirement container and one of the test case containers to represent a validated-by relationship; and using the annotated edges between the one or more child requirement containers and another one of test case containers to represent a verified-by relationship.

8. The NCRM of claim 1, further comprising displaying in the requirement containers and the test containers a summary of informational details, comprising:

in the requirement containers displaying a total number of the hierarchical data items, and an indication of internal relationship coverage of different requirement hierarchical data item types; and in the test containers, displaying a total number of test cases that are assigned to a test plan, a total number of test cases whose most recent test has passed, or a total number of visible test cases that do not have a relationship with any of the hierarchical data items in a related requirements container.

9. The NCRM of claim 1, further comprising displaying in the interactive GUI:

filter controls that enable the user to filter which of the groups of the hierarchical data items are displayed.

10. A computer-implemented method for displaying an interactive graphical user interface (GUI) for viewing and navigating among sets of hierarchical data items, the method performed by instructions stored in a memory of a server cluster and executed by the server cluster, the method comprising:

monitoring the hierarchical data items from a data source, the hierarchical data items comprising a hierarchy of requirement data items and a hierarchy of test case items, where ones of the hierarchy of requirement data items are validated or verified based on sets of relationships between the hierarchical data items;

responsive to detecting which ones of the hierarchical data items have changed based on database update operations, determining which ones of the sets of relationships are suspect based on the changes;

combining the hierarchical data items into groups;

determining what percentage of the hierarchical data items in each of the groups have suspect relationships; and displaying on a display of a computing device of a user the interactive GUI, comprising:

containers representing and containing respective groups of the hierarchical data items, the containers displayed in at least two columns where a first column comprises requirement containers representing the hierarchy of requirement data items and a second column comprises test containers representing the hierarchy of test case items, where the first column of requirement containers includes a root container and one or more child containers, and for ones of the requirement containers, there is a corresponding test container in the second column;

annotated edges between pairs of the containers, each of the annotated edges indicating a type of relationship between the hierarchical data items in a respective pair of the containers and a percentage of the hierarchical data items in the respective pair of the containers that have the suspect relationships, wherein the percentage of suspect relationships is automatically recalculated in response to the database update operations such that the annotated edges are dynamically updated;

and a treeview control displayed within the containers that, responsive to user selection, displays a hierarchical structure of the hierarchical data items contained therein as nodes in a tree structure, wherein the treeview control enables users to expand and collapse the nodes to view subnodes and to select a specific node to view the hierarchical data items the specific node contains, and wherein the treeview control enables navigation through the hierarchical structure of the hierarchical data items to identify data items having the suspect relationships;

receiving user selection of a section in a container containing the hierarchical data items having the suspect relationships, displaying the hierarchical data items having the suspect relationships in a detailed view;

receiving user changes to the hierarchical data items having the suspect relationships in the detailed view;

and clearing a suspect property associated with the hierarchical data items having the suspect relationships based on the received user changes.

11. The method of claim 10, further comprising displaying the annotated edges with additional textual or graphical information summarizing a status or a quality of the sets of relationships assigned to the respective annotated edge.

12. The method of claim 11, further comprising displaying in the annotated edges another percentage of the hierarchical data items in the respective pair of the containers that have relationships that are not suspect.

13. The method of claim 11, further comprising displaying the annotated edges with two sections, where a length of a first section represents the percentage of the sets of relationships that are suspect, and a length of a second section represents the percentage of the sets of relationships that are not suspect.

14. The method of claim 11, further comprising displaying the annotated edges with a total number value of suspect relationships in the respective pair of the containers.

15. The method of claim 10, wherein the first set comprise a root requirement container and one or more child requirement containers.

16. The method of claim 15, further comprising using the annotated edges between pairs of the requirement containers to represent a satisfied-by relationship; using the annotated edges between the root requirement container and one of the test case containers to represent a validated-by relationship; and using the annotated edges between the one or more child requirement containers and another one of test case containers to represent a verified-by relationship.

17. The method of claim 10, further comprising displaying in the requirement containers and the test containers a summary of informational details, comprising:

in the requirement containers displaying a total number of the hierarchical data items, and an indication of internal relationship coverage of different requirement hierarchical data item types; and in the test containers, displaying a total number of test cases that are assigned to a test plan, a total number of test cases whose most recent test has passed, or a total number of visible test cases that do not have a relationship with any of the hierarchical data items in a related requirements container.

18. The method of claim 10, further comprising displaying in the interactive GUI:

filter controls that enable the user to filter which of the groups of the hierarchical data items are displayed.

19. A requirements management system with tracking and display of dynamic requirements information of a project in substantially real-time, comprising:

a data source;

a memory;

a processor coupled to the memory;

and a software component executed by the processor that is configured to:

monitor and retrieve hierarchical data items from the data source, the hierarchical data items comprising a hierarchy of requirement data items and a hierarchy of test case items, where ones of the requirement data items are validated or verified based on sets of relationships between the hierarchical data items;

display on a client device over a network a graphical user interface (GUI) of the sets of relationships between hierarchical data items, the GUI comprising:

a first set of requirement containers representing a plurality of development phases a project, where each of the requirement containers contain a grouping of one or more of the hierarchical data items that belong to a represented one of the plurality of development phases;

a second set of test containers representing a plurality of test phases for the project, where each of the test containers is related to one of the requirement containers and includes a grouping of one or more of the hierarchical data items that belong to a represented one of the plurality of test phases;

a first set of edges linking adjacent ones of the requirement containers;

a second set of edges linking the requirement containers to the related test containers, wherein the first set of edges and the second set of edges are displayed with an indication of a percentage of relationships assigned to that edge that are suspect, or a total number of suspect relationships assigned to that edge;

wherein the percentage of suspect relationships is automatically recalculated in response to database update operations such that the annotated edges are dynamically updated;

and a treeview control displayed within the first set of requirement containers and the second set of test containers that, responsive to user selection, displays a hierarchical structure of the data items contained therein as nodes in a tree structure, wherein the treeview control enables users to expand and collapse nodes to view subnodes and to select a specific node to view the data items the specific node contains, and wherein the treeview control enables navigation through the hierarchical structure of data items to identify data items having the suspect relationships;

receiving user selection of a section in a container containing the hierarchical data items having the suspect relationships, displaying the hierarchical data items having the suspect relationships in a detailed view;

receiving user changes to the hierarchical data items having the suspect relationships in the detailed view;

and clearing a suspect property associated with the hierarchical data items having the suspect relationships based on the received user changes.

20. The requirements management system of claim 19, wherein the GUI further displays:

filter controls that enable a user to filter which of the grouping of one or more hierarchical data items in the plurality of development phases or the plurality of test phases are displayed.

\*   \*   \*   \*   \*